US010622864B2

(12) United States Patent
Hiramitsu et al.

(10) Patent No.: US 10,622,864 B2
(45) Date of Patent: Apr. 14, 2020

(54) ELECTRIC MOTOR UNIT AND DRIVE UNIT FOR VEHICLE

(71) Applicant: JTEKT CORPORATION, Osaka-shi (JP)

(72) Inventors: Akira Hiramitsu, Okazaki (JP); Ryohei Shigeta, Anjo (JP); Yoshinao Iwase, Nagoya (JP); Keita Nomura, Kariya (JP); Masayuki Kikuchi, Toyota (JP); Yoshiyasu Sakai, Toyota (JP)

(73) Assignee: JTEKT CORPORATION, Osaka-shi (JP)

( * ) Notice: Subject to any disclaimer, the term of this patent is extended or adjusted under 35 U.S.C. 154(b) by 364 days.

(21) Appl. No.: 15/543,249

(22) PCT Filed: Jan. 18, 2016

(86) PCT No.: PCT/JP2016/051322
§ 371 (c)(1),
(2) Date: Jul. 13, 2017

(87) PCT Pub. No.: WO2016/117513
PCT Pub. Date: Jul. 28, 2016

(65) Prior Publication Data
US 2018/0006522 A1 Jan. 4, 2018

(30) Foreign Application Priority Data
Jan. 22, 2015 (JP) .................................. 2015-010264

(51) Int. Cl.
*H02K 11/00* (2016.01)
*H02K 5/22* (2006.01)
(Continued)

(52) U.S. Cl.
CPC ............... *H02K 5/225* (2013.01); *H02K 3/50* (2013.01); *H02K 3/522* (2013.01); *H02K 7/116* (2013.01); *H02K 7/08* (2013.01); *H02K 2203/09* (2013.01)

(58) Field of Classification Search
USPC .......................................................... 310/71
See application file for complete search history.

(56) References Cited

U.S. PATENT DOCUMENTS

2008/0211332 A1* 9/2008 Kataoka ................. H02K 3/522
310/71
2012/0286593 A1* 11/2012 Yokogawa ............. H02K 1/278
310/43
(Continued)

FOREIGN PATENT DOCUMENTS

JP 2006-219994 A 9/2006
JP 2007-221962 A 8/2007
(Continued)

OTHER PUBLICATIONS

International Search Report dated Mar. 22, 2016 in PCT/JP2016/051322 filed Jan. 18, 2016.
(Continued)

*Primary Examiner* — Alexander Talpalatski
(74) *Attorney, Agent, or Firm* — Oblon, McClelland, Maier & Neustadt, L.L.P.

(57) ABSTRACT

An electric motor unit includes an electric motor and a connection module. The electric motor includes motor coils, a stator and a rotor. The electrical connection module includes a power feed bus bar and a neutral bus bar. The power feed bus bar includes power feed collars for each phase, in which terminal portions for each phase are arranged. The neutral bus bar includes a neutral collar in which neutral terminal portions are arranged. When viewed in a direction intersecting with a second cross section, which
(Continued)

intersects with a first cross section containing all the neutral terminal portions, the minimum distance between a second cross-section neutral terminal row on the second cross section and a second cross-section power feed terminal row on the second cross section is greater than zero.

9 Claims, 9 Drawing Sheets

(51) Int. Cl.
*H02K 3/50* (2006.01)
*H02K 3/52* (2006.01)
*H02K 7/116* (2006.01)
*H02K 7/08* (2006.01)

(56) References Cited

U.S. PATENT DOCUMENTS

| | | |
|---|---|---|
| 2012/0319512 A1 | 12/2012 | Nakagawa |
| 2014/0028127 A1* | 1/2014 | Chamberlin .......... H02K 3/522 310/71 |
| 2014/0354094 A1* | 12/2014 | Yazaki .................. H02K 3/522 310/71 |
| 2016/0072351 A1* | 3/2016 | Mizoue ................. H02K 3/522 310/71 |

FOREIGN PATENT DOCUMENTS

| | | |
|---|---|---|
| JP | 2010-241178 A | 10/2010 |
| JP | 2011-205875 A | 10/2011 |
| JP | 2012-143019 A | 7/2012 |
| JP | 2014-187797 A | 10/2014 |

OTHER PUBLICATIONS

International Preliminary Report on Patentability and Written Opinion dated Jul. 25, 2017 in PCT/JP2016/051322 (English translation only).

* cited by examiner

ELECTRIC MOTOR UNIT AND DRIVE UNIT FOR VEHICLE

TECHNICAL FIELD

The present invention relates to an electric motor unit and a vehicle drive unit.

BACKGROUND ART

Patent Document 1 describes a known vehicle drive unit that transmits the rotation torque generated by an electric motor to wheels. Patent Document 2 describes a known electric motor unit formed by combining a plurality of bus bars associated with coils of U, V and W phases and a neutral bus bar connecting the coils to one another. In the structure of Patent Document 2, the bus bars are arranged in the same direction as the axis of the electric motor. The phase terminals of different phases, which are coil terminals of the stator, and neutral terminals are arranged alternately along the circumference of a circle about the axis of each bus bar.

PRIOR ART DOCUMENTS

Patent Documents

Patent Document 1; Japanese Laid-Open Patent Publication No. 2010-241178

Patent Document 2: Japanese Laid-Open Patent Publication No. 2011-205875

SUMMARY OF THE INVENTION

Problems that the Invention is to Solve

In view of installation into a vehicle, a smaller electric motor unit is desirable. However, if the size of the electric motor unit of Patent Document 2 is reduced, phase terminals of different phases will be located closer to the neutral terminals. This may cause difficulties in insulating the terminals.

It is an objective of the present invention to provide an electric motor unit and a vehicle drive unit that can be reduced in size.

Means for Solving the Problems

To achieve the foregoing objective and in accordance with a first aspect of the present invention, an electric motor unit is provided that includes an electric motor and a connection module. The electric motor includes a plurality of motor coils, which supplies power, a cylindrical stator, around which the motor coils are individually wound, and a rotor, which is coaxial with the stator. The connection module includes a power feed member, which connects a supply source of the power and the motor coils, and a neutral member, which connects the motor coils to one another. The power feed member includes a power feed distribution member, which includes an arrangement of a plurality of terminal portions. The neutral member includes a neutral distribution member, which includes an arrangement of a plurality of terminal portions. A plane that includes all of the terminal portions of the power feed member or all of the terminal portions of the neutral member is defined as a first cross section. A plane that intersects with the first cross section is defined as a second cross section. When viewed in a direction intersecting with the second cross section, a distance between closest points in the arrangement of the terminal portions of the power feed member and the arrangement of the terminal portions of the neutral member is greater than zero.

In the structure described above, the terminal portions of the power feed member are not on the same circumference as the terminal portions of the neutral member and are separated from the terminal portions of the neutral member at least when viewed in a direction intersecting the second cross section. This structure results in longer distances between adjacent terminal portions in each of the power feed member and the neutral member as compared to a structure in which the terminal portions or the power feed member and the terminal portions of the neutral member are located on the same circumference. This enables adjacent terminal portions of the power feed member and the neutral member to be closer while maintaining sufficient insulation, allowing for reduction in the size of the electric motor unit.

In the above described electric motor unit, the terminal portions of the power feed member and the terminal portions of the neutral member are preferably in annular arrangements. When viewed in a direction intersecting with the first cross section, a distance between closest points in the arrangement of the terminal portions of the power feed member and the arrangement of the terminal portions of the neutral member is preferably greater than zero.

In the structure described above, the terminal portions of the power feed member are separated from the terminal portions of the neutral member when viewed in a direction intersecting with the first cross section, in addition to the second cross section, in the radial direction of the circle formed by the terminal portions. This increases the distance between the terminal portions of the power feed member and the terminal portions of the neutral member, facilitating insulation between the power feed member and the neutral member. In addition, annular arrangements of the terminal portions of the power feed member and the neutral member facilitate adjustment of the arrangement of terminal portions.

In the above described electric motor unit, the power feed member and the neutral member are preferably each covered by an insulation member with the terminal portions exposed. One of the insulation member covering the power feed member and the insulation member covering the neutral member preferably includes an opening between specific adjacent ones of the terminal portions.

In the structure described above, the insulation member provides insulation between the terminal portions located on the opposite sides of the opening. In addition, mechanical portions and connectors of other units and components of peripheral devices can be placed between the terminal portions insulated by the opening. This facilitates installation of the electric motor unit into another unit, allowing for reduction in the size of the unit in which the electric motor unit is installed.

In the above described electric motor unit, the connection module is preferably an assembly obtained by coupling the insulation member covering the power feed member and the insulation member covering the neutral member to each other or a single member in which the insulation member covering the power feed member and the insulation member covering the neutral member are integrated.

This structure minimizes the distance between the power feed member and the neutral member, while still providing insulation between the power feed member and the neutral member and between the terminal portions. This allows for reduction in the size of the electric motor unit.

To achieve the foregoing objective and in accordance with a second aspect of the present invention, a vehicle drive unit is provided that includes the above described electric motor unit and a transmission mechanism that transmits rotation torque, which is obtained by reducing rotation speed of the electric motor using a plurality of gears, to a drive wheel of a vehicle through a drive shaft. The connection module is located on the electric motor near the transmission mechanism. The opening of the one of the insulation member covering the power feed member and the insulation member covering the neutral member receives part of the transmission mechanism.

Part of the transmission mechanism includes the transmission mechanism itself (housing), a plurality of gears forming the transmission mechanism, and components associated with the shaft, for example.

This structure allows the opening to receive part of the transmission mechanism and thus allows the electric motor unit and the transmission mechanism to be close to each other when combined into a unit as compared to a structure that lacks the opening. In addition, the electric motor unit is reduced in size while maintaining insulation, thereby reducing the size of the vehicle drive unit. Moreover, sufficient ground clearance, which is the vertical distance between the ground surface and the lowest point in the vehicle, is ensured when the vehicle drive unit is installed in a vehicle.

In the above described vehicle drive unit, the electric motor is preferably driven by the power supplied to the power feed member from the supply source through a connector to rotate an output shaft, which is inserted in the rotor, thereby generating rotation torque. The power feed member preferably has an outer diameter that is less than or equal to an outer diameter of the stator, and the power feed member preferably has an inner diameter that is greater than or equal to an outer diameter of the output shaft.

In the structure described above, the connector, which is positioned relative to the power feed member, is located on the electric motor near the output shaft. Additionally, the area of the connector that extends beyond the outer diameter of the electric motor is reduced. This allows for reduction in the size of the vehicle drive unit.

In the above described vehicle drive unit, the transmission mechanism preferably includes a plurality of rotary shafts that serves as rotary shafts of the gears. The rotary shafts preferably include an input shaft that is coupled to an output shaft inserted in the rotor, an intermediate shaft that is parallel to the input shaft, and a drive shaft that is parallel to the intermediate shaft. Axes of the input shaft, the intermediate shaft, and the drive shaft are preferably coplanar.

In the structure described above, the opening of the insulation member receives part of the transmission mechanism, such as a plurality of rotary shafts and gears of the rotary shafts. Thus, the electric motor unit and the transmission mechanism, which includes rotary shafts such as the input shaft, the intermediate shaft, and the drive shafts, are combined into a unit with a minimum distance between each other. This allows for reduction in the size of the vehicle drive unit and also provides sufficient ground clearance when the vehicle drive unit, is installed in a vehicle. In addition, coplanar shafts achieve a flat vehicle drive unit. This provides more space for the chassis and vehicle structural parts forming the cargo apace of the vehicle.

In the above described vehicle drive unit, the electric motor unit and the transmission mechanism are preferably accommodated in a common housing.

This structure allows the electric motor unit and the transmission mechanism to be further close to each other when combined into a unit as compared to a structure that places the electric motor unit and the transmission mechanism in separate housings.

In the above described vehicle drive unit, a bearing is preferably placed on a radially inner side of the power feed member to rotationally support an output shaft inserted in the rotor, and the power feed member preferably has an inner diameter that is greater than or equal to an outer diameter of the bearing.

In the structure described above, part of the electric motor unit is used as the space for the bearing supporting the output shaft of the electric motor. This structure allows the electric motor unit and the transmission mechanism to be combined into a unit with a minimum distance between each other.

In the above described vehicle drive unit, the power reed member and the transmission mechanism preferably overlap in an axial direction of an output shaft inserted in the rotor.

This structure allows the electric motor unit and the transmission mechanism to be combined into a unit with a minimum distance between each other in the axial direction of the output shaft of the electric motor.

Effects of the Invention

The present invention allows for reduction in the sizes of an electric motor unit and a vehicle drive unit.

MODES FOR CARRYING OUT THE INVENTION

An electric motor unit and a vehicle drive unit according to one embodiment will now be described.

Figure 1:
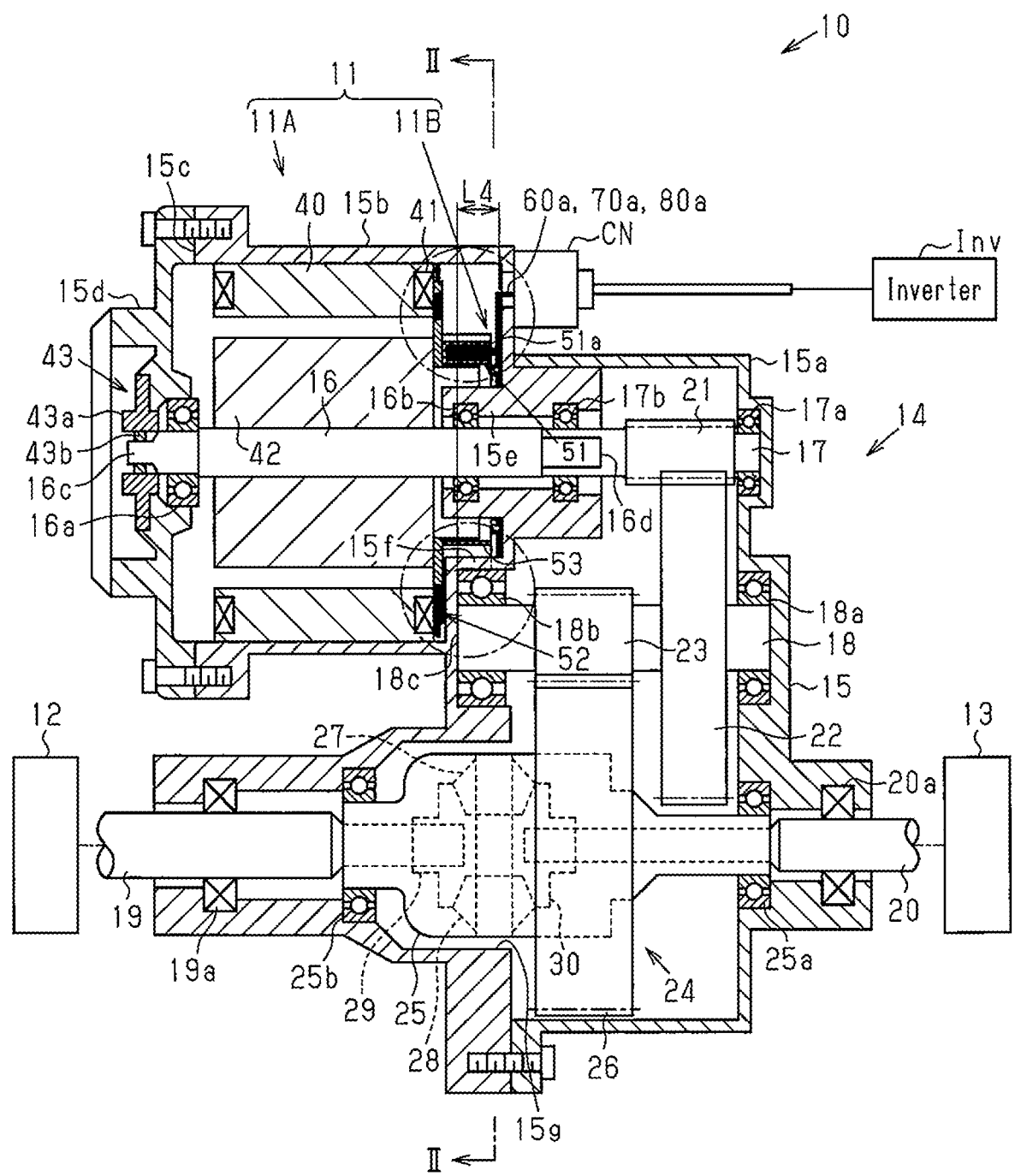
FIG. 1 is a schematic cross-sectional view showing a vehicle drive unit and an electric motor unit.

As shown in FIG. 1, a vehicle drive unit 10 is installed in a four-wheel drive vehicle in which the rear wheels are driven by the rotation torque generated by an electric motor 11A of an electric motor unit 11. The vehicle drive unit 10 is located between drive wheels 12 and 13, which are rear wheels. The vehicle drive unit 10 is placed in the lower rear section of the vehicle chat faces the ground with a sufficient ground clearance.

The electric motor unit 11 and a transmission mechanism 14 are combined into the vehicle drive unit 10. The electric motor unit 11 includes the electric motor 11A, which generates rotation torque when driving power is supplied to the electric motor 11A, and a connection module 11B, which electrically connects the electric motor 11A to a power supply source. The transmission mechanism 14 includes a plurality of gears, which transmits the rotation torque obtained by reducing the rotation speed of the electric motor 11A to the drive wheels 12 and 13, and a plurality of rotary shafts, which serves as rotary shafts of the gears.

The electric motor unit 11 and the transmission mechanism 14 are accommodated in a common housing 15. The housing 15 includes a cylindrical gear housing 15a and a motor housing 15b, which includes a housing opening 15c. The gear housing 15a is fastened to the motor housing 15b with bolts. A cover 15d is coupled to the motor housing 15b with bolts so as to close the housing opening 15c.

The transmission mechanism 14 will now be described in detail.

Figure 2:
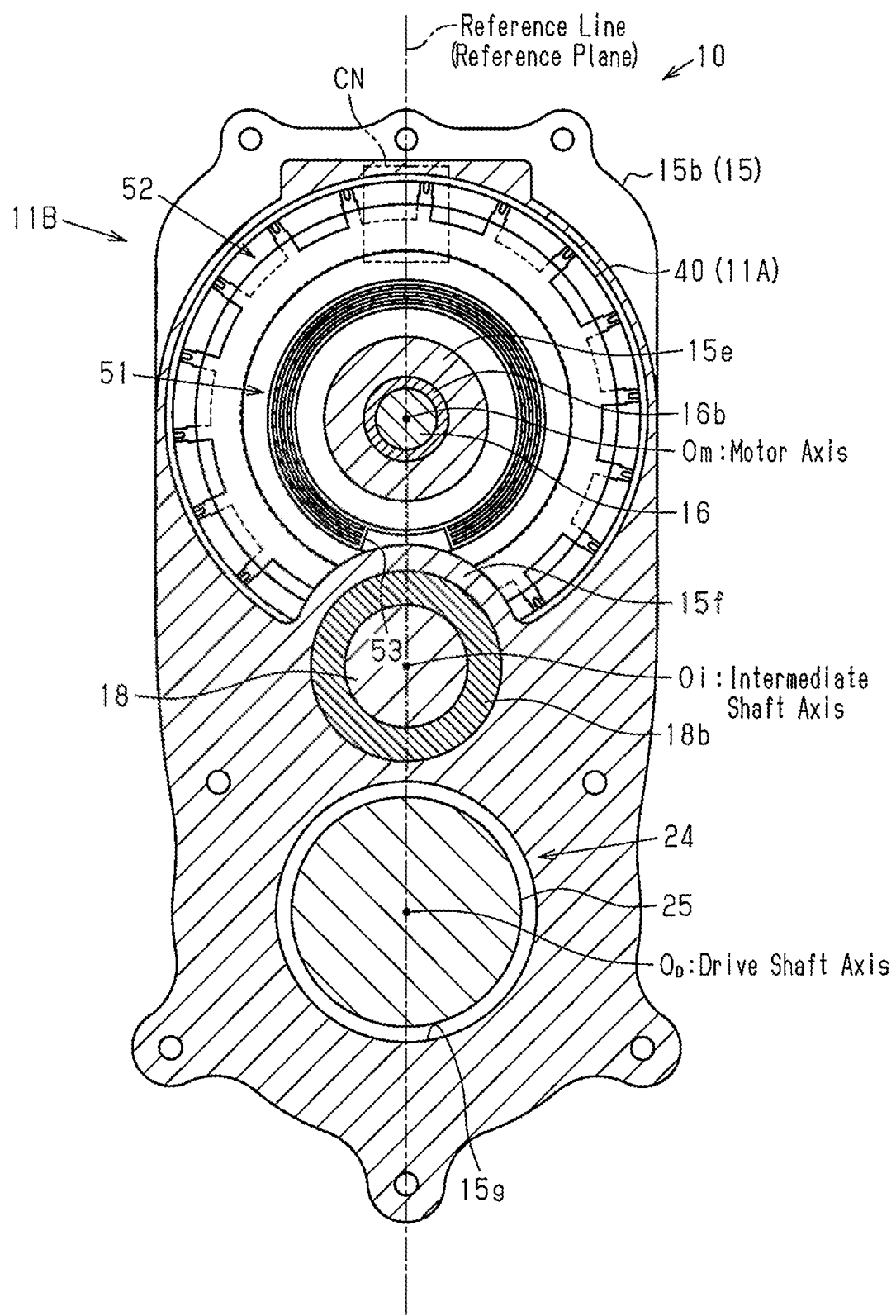
FIG. 2 is a cross-sectional view taken along line II-II in FIG. 1.

As shown in FIGS. 1 and 2, the transmission mechanism 14 includes an input shaft 17, which serves as a rotary shaft for inputting the rotation torque generated by the electric motor 11A to the transmission mechanism 14. The electric motor 11A includes an output shaft 16, which outputs the rotation torque. The input shaft 17 is mechanically coupled to an end 16d of the output shaft 16 near the transmission mechanism 14. A bearing 17a, which is fixed to the gear housing 15a, and a bearing 17b, which is fixed to the motor housing 15b, rotationally support the input shaft 17. The motor housing 15b includes a bearing holder 15e located around the output shaft 16. The bearing 17b is fixed to the bearing holder 15e near the transmission mechanism 14. An input gear 21 is fixed to the input shaft 17 so as to rotate together with the input shaft 17.

The input gear 21 meshes with a first intermediate gear 22, which is fixed to an intermediate shaft 18 so as to rotate together with the intermediate shaft 18. The intermediate shaft 18 is parallel to the output shaft 16 and the input shaft 17. A bearing 18a, which is fixed to the gear housing 15a, and a bearing 18b, which is fixed to the motor housing 15b, rotationally support the intermediate shaft 18. The motor housing 15b includes a bearing holder 15f located around the intermediate shaft 18. The bearing 18b is fixed to the bearing holder 15f. A second intermediate gear 23 is fixed to a section of the intermediate shaft 18 between the first intermediate gear 22 and the bearing 18b so as to rotate together with the intermediate shaft 18.

The second intermediate gear 23 meshes with an output gear 26, which is fixed to a differential carrier 25 of a differential gear 24 (hereinafter referred to as "differential") so as to rotate together with the differential carrier 25. The motor housing 15b includes a differential accommodation section 15g, which accommodates the differential 24. The bearing holder 15f is located between the differential 24 and the bearing holder 15e. A bearing 25a, which is fixed to the gear housing 15a, and a bearing 25b, which is fixed to the motor housing 15b, rotationally support the differential carrier 25.

The differential 24 includes a pair of pinion gears 27 and 28, which is rotational in the differential carrier 25, and a pair of side gears 29 and 30, which meshes with the pinion gears 27 and 28. A drive shaft 19, which serves as a drive shaft, is fixed to the side gear 29 so as to rotate together with the side gear 29. The drive shaft 19 is parallel to the output shaft 16, the input shaft 17, and the intermediate shaft 18. The drive shaft 19 is mechanically coupled to the drive wheel 12. In the motor housing 15b, a gasket 19a is fixed to the drive shaft 19 near the drive wheel 12 to limit leakage of lubricating oil from the transmission mechanism 14. A drive shaft 20, which serves as a drive shaft, is fixed to the side gear 30 so as to rotate together with the side gear 30. The drive shaft 20 is parallel to the output shaft 16, the input shaft 17, and the intermediate shaft 18. The drive shaft 20 is mechanically coupled to the drive wheel 13. In the gear housing 15a, a gasket 20a is fixed to the drive shaft 20 near the drive wheel 13 to limit leakage of lubricating oil from the transmission mechanism 14. Joints (not shown), such as flange joints, connect the drive shafts 19 and 20 to the drive wheels 12 and 13, respectively.

The structure of the electric motor 11A will now be described in detail.

As shown in FIG. 1, a cylindrical stator 40, which includes a plurality of teeth, is fixed near the housing opening 15c. Motor coils 41 are wound around respective teeth with an insulator placed between the motor coils 41 and the teeth. The first end of the lead wire of each motor coil 41 is connected to a corresponding one of phase terminal portions 61, 71, and 81 of three phases of U, V and W. The phase terminal portions 61, 71, and 81 will be described in detail below. The second end of the lead wire of each motor coil 41 is connected to a neutral terminal portion 101, which will be described below. The motor coils 41 are connected in a star connection (Y connection).

A cylindrical rotor 42, which rotates together with the output shaft 16, is located on the radially inner side of the stator 40. The rotor 42 is coupled to the outer circumferential surface of the output shaft 16. In other words, the output shaft 16 is inserted in the rotor 42. A plurality of permanent magnets is fixed to the outer circumference of the rotor 42 such that their north and south poles alternate in the circumferential direction. A bearing 16a, which is fixed to the cover 15d, and a bearing 16b, which is fixed to the motor housing 15b, rotationally support the output shaft 16. The bearing 16b is fixed to the bearing holder 15 near the electric motor 11A. The electric motor 11A is an inner rotor motor. A gasket (not shown) is fixed between the bearing 16b and the bearing 17b to limit leakage of lubricating oil from the transmission mechanism 14.

A resolver 43 is coupled to an end 16c of the output shaft 16 that is opposite to the transmission mechanism 14 to detect the rotation angle of the rotor 42. The resolver 43 is located in the cover 15d and coaxial with the rotor 42. A revolver stator 43a is fixed on the radially inner side of the cover 15d. A cylindrical resolver rotor 43b is located on the radially inner side of the resolver stator 43a. The resolver rotor 43b rotates together with the output shaft 16. The resolver rotor 43b is coupled to the outer circumferential surface of the output shaft 16. In other words, the output shaft 16 is inserted in the resolver rotor 43b. The connection module 11B is located on the end 16d of the output shaft 16 near the transmission mechanism 14. The connection module 11B is formed by modularizing a plurality of bus bars into a ring shape.

The structure of the connection module 11B will now be described in detail.

As shown in FIG. 1, the connection module 11B includes a cylindrical power feed bus bar 51, which serves as a power feed member, and a disc-shaped neutral bus bar 52, which serves as a neutral member. The power feed bus bar 51 connects the first end of each motor coil 41 to an inverter Inv, which is a supply source of driving power of the electric motor 11A, via a connector CN (supply portions 60a, 70a, and 80a). The inverter Inv is connected to a control circuit, which controls the operation of the inverter Inv. The neutral bus bar 52 connects the first ends of the motor coils 41 to the second ends on the opposite side. The connector CN projects outward from the motor housing 15b. The connector CN is located on the electric motor 11A near the transmission mechanism 14.

As shown in FIGS. 1 and 2, the inner diameters of the power feed bus bar 51 and the neutral bus bar 52 are greater than or equal to the outer diameter of the bearing holder 15e (the bearing 16b) of the motor housing 15b, and, in the present embodiment, greater than the outer diameter of the bearing holder 15e. The outer diameter of the bearing holder 15e (the bearing 16b) of the motor housing 15b is greater than the outer diameter of the output shaft 16. Accordingly, the inner diameters of the power feed bus bar 51 and the neutral bus bar 52 are greater than or equal to the outer diameter of the output shaft 16, and, in the present embodiment, greater than the outer diameter of the output shaft 16. In addition, the outer diameters of the power feed bus bar 51 and the neutral bus bar 52 are less than or equal to the outer diameter of the stator 40, and, in the present embodiment, less than the outer diameter of the stator 40. The outer diameter of the neutral bus bar 52 is greater than or equal to the outer diameter of the power feed bus bar 51, and, in the present embodiment, greater than the outer diameter of the power feed bus bar 51.

The bearing holder 15e is located on the radially inner side of the connection module 11B. The bearing holder 15e extends from the motor housing 15b toward the electric motor 11A. The bearing 16b is located on the radially inner side of the connection module 11B together with the output shaft 16.

The power feed bus bar 51 is located between the neutral bus bar 52 and the transmission mechanism 14. The power feed bus bar 51 projects toward the transmission mechanism 14, resulting in the connection module 11B having an L-shaped (top hat-shaped) cross section. The connection module 11B is fixed to the electric motor 11A near the transmission mechanism 14 by a predetermined fixing method.

The power feed bus bar 51 is located between the neutral bus bar 52 and the transmission mechanism 14 and accommodated in a space near the transmission mechanism 14 on the radially inner side of the motor housing 15b. More specifically, the power feed bus bar 51 is located in a space between the output shaft 16 and the intermediate shaft 18 on the radially outer side of the output shaft 16. The power feed bus bar 51 is also located in a space between the output shaft 16 and the connector CN on the radially outer side of the output shaft 16. The neutral bus bar 52 is located between the power feed bus bar 51 and the electric motor 11A in the connection module 11B and also located in a space near the electric motor 11A on the radially inner side of the motor housing 15b.

Figure 3:
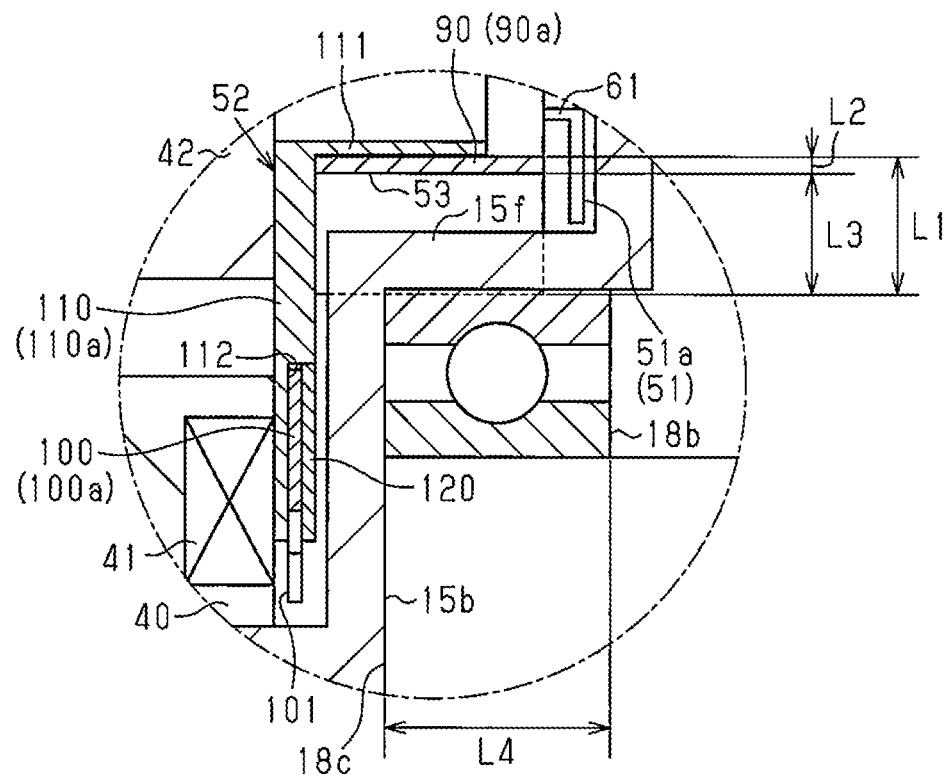
FIG. 3 is an enlarged partial cross-sectional view showing a connection module of the electric motor unit.

As shown in FIGS. 2 and 3, the power feed bus bar 51 includes an opening 53 near the differential 24 to avoid interference with the bearing 18b of the transmission mechanism 14 and the bearing holder 15f. The section of the power feed bus bar 51 corresponding to the opening 53 has a thickness L2 that is smaller than a thickness L1 of the other section by a thickness L3. That is, the section, of the power feed bus bar 51 corresponding to the opening 53 has a smaller outer diameter than the other section. The opening 53 extends over a range that is less than or equal to half of the entire circumference of the power feed bus bar 51, such as ever one-eighth of the entire circumference (a circumferential angle at 45°), in order to avoid interference with the bearing holder 15f.

The opening receives the bearing holder 15f as well as the bearing 18b. Since the bearing holder 15f is located in the opening 53, the power feed bus bar 51 is located in a space between the output shaft 16 and the intermediate shaft 16. The transmission mechanism 14 and the connection module 11B overlap by a distance L4 in the axial direction of the output shaft 16. In this state, an intermediate shaft end face 18c of the intermediate shaft 18 near the electric motor 11A, which is an end face of the transmission mechanism 14, is spaced apart, from a bus bar end face 51a near the transmission mechanism 14, which is an end face of the connection module 118, by the distance L4.

The structures of the power feed bus bar 51 and the neutral bus bar 52 will now be described in detail.

First, the structure of the power feed bus bar 51 will now be described referring to FIGS. 5 and 6. The power feed bus bar 51 includes a U-phase power feed collar 60, a V-phase power feed collar 70, and a W-phase power feed collar 80, which are made of metal plates such as copper plates. The power reed bus bar 51 is held by a power feed collar holder 90, which is made of an insulating material such as plastic and serves as an insulator. The phase power feed collars 60, 70, and 80 are power distribution members that electrically connect the connector CN to the first ends of lead wires of motor coils 41, which ere connected to the phase terminal portions 61, 71, and 81 of different phases. The phase power feed collars 60, 70, and 80 include planar supply portions 60a, 70a, and 80a, respectively, which project toward the connector CN. The supply portions 60a, 70a, and 80a supply electricity of respective phases from the inverter Inv.

Figure 5:
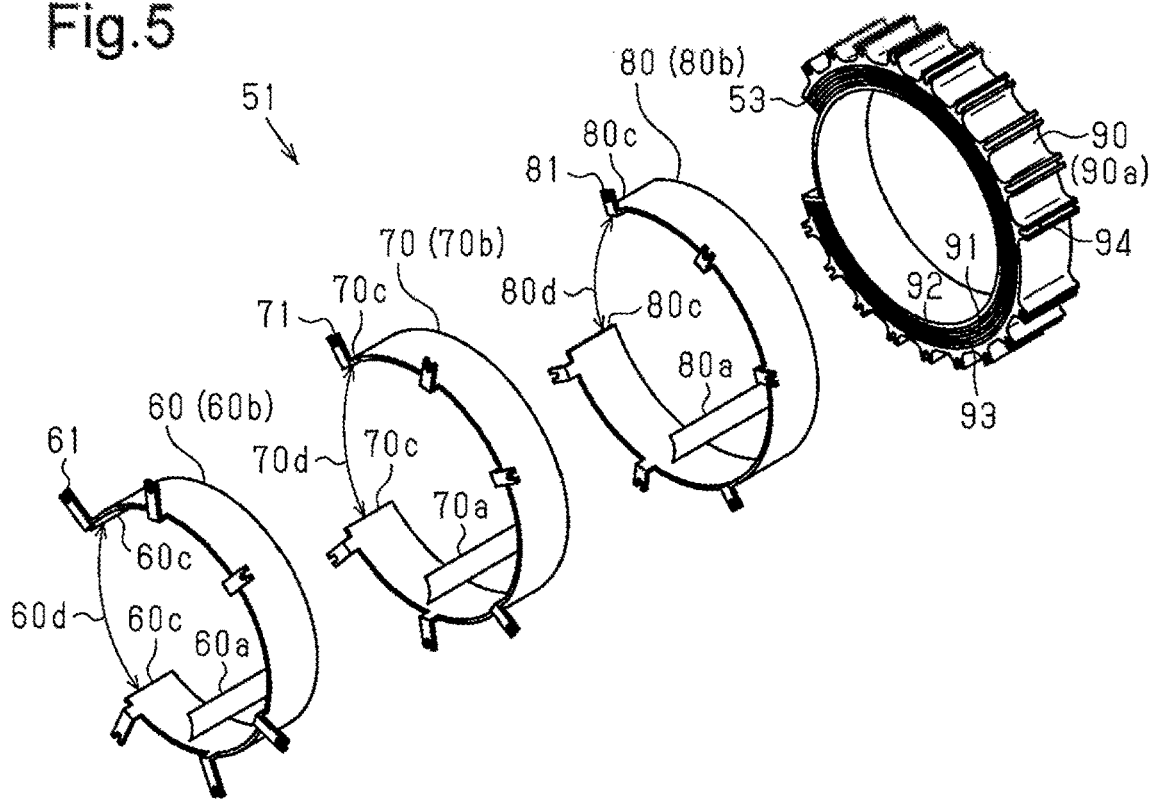
FIG. 5 is an exploded perspective view showing a power feed bus bar of the connection module.

As shown in FIG. 5, the U-phase power feed collar 60 includes a main body 60b, which is formed by bending a metal plate Into the shape of letter C. The clearance between the ends 60c of the main body 60b, which face each other in the circumferential direction, serves as a gap 60d. The main body 60b includes six U-phase terminal portions 61, which are connected to the first ends of the lead wires of the motor coils 41 associated with the U phase. The U-phase terminal portions 61 are in an annular arrangement in the circumferential direction of the main body 60b. The U-phase terminal portions 61 are arranged over an open line segment starting at one of the ends 60c, which define the gap 60d, and ending at the other end 60c. That is, the U-phase terminal portions 61 are arranged to form a chord of a circle. The U-phase terminal portions 61 are arranged on the open line segment at uniform intervals in the circumferential direction of the main body 60b.

The V-phase power feed collar 70 includes a main body 70b, which is formed by bending a metal plate into the shape of letter C. The clearance between the ends 70c of the main body 70b, which face each other in the circumferential direction, serves as a gap 70d. The main body 70b includes six v-phase terminal portions 71, which are connected to the first ends of the lead wires of the motor coils 41 associated with the V phase. The V-phase terminal portions 71 are in an annular arrangement in the circumferential direction of the main body 70b. In the main body 70b, when one of the ends 70c defining the gap 70d is a start point and the other is an end point, the ends 70c define an open line segment, that is, a chord of a circle. The V-phase terminal portions 71 are arranged on the open line segment at uniform intervals in the circumferential direction of the main body 70b.

The W-phase power feed collar 80 includes a main body 80b, which is formed by bending a metal plate into the shape of letter C. The clearance between the ends 80c of the main body 80b, which face each other in the circumferential direction, serves as a gap 80d. The main body 80b includes six W-phase terminal portions 81, which are connected to the first ends of the lead wires of the motor coils 41 associated with the W phase. The W-phase terminal portions 81 are in an annular arrangement in the circumferential direction of the main body 80b. In the main body 80b, when one of the ends 80c defining the gap 80a is a start point and the other is an end point, the ends 80c define an open line segment, that is, a chord of a circle. The W-phase terminal portions 81 are arranged on the open line segment at uniform intervals in the circumferential direction of the main body 80b.

A power feed collar holder 90 includes a cylindrical holder main body 90a made of an insulating material. The holder main body 90a includes the opening 53 in a predetermined position. The section of the holder main body 90a other than the opening 53 includes three retention grooves 91 to 93. The retention grooves 91, 92 and 93 are arranged in this order from the radially inner side of the holder main body 90a to hold the phase power feed collars 60, 70, and 80, respectively. The retention grooves 91 to 93 extend in the circumferential direction of the holder main body 90a and open to one side in the axial direction of the holder main body 90a. The outer circumferential surface of the section of the holder main body 90a other than the opening 53 includes a plurality of guide grooves 94, which guides wires of the motor coils 41. The present embodiment includes 18 guide grooves 94, six grooves for each phase. The guide grooves 94 extend in the axial direction of the holder main body 90a. The length of guide grooves 94 is set such that the distal ends of the guide grooves 94 meet the distal ends of the phase terminal portions 61, 71, and 81.

Figure 6:
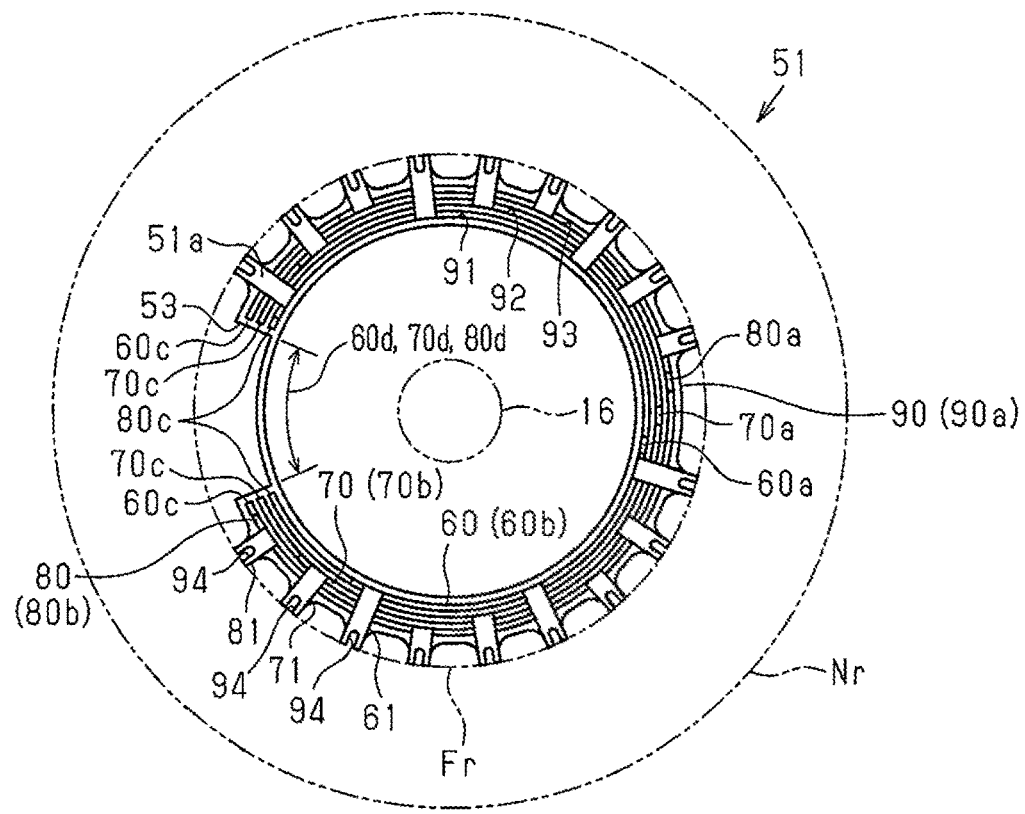
FIG. 6 is a front view showing the power feed bus bar.

As shown in FIG. 6, the power feed collar holder 90 holds the phase power feed collars 60, 70, and 80. In this position, the main bodies 60b, 70b, and 80b of the phase power feed collars 60, 70, and 80 are insulated from one another. The retention groove 91 is located on the innermost side of the holder main body 90a in the radial direction. The retention groove 91 receives the main body 60b with the U-phase terminal portions 61 exposed. The retention groove 93 is located on the outermost side of the holder main body 90a in the radial direction. The retention groove 92 is located between the retention groove 91 and the retention groove 93 in the holder main body 90a. The retention groove 92 receives the main body 70b with the V-phase terminal portions 71 exposed. The retention groove 93 receives the main body 80b with the W-phase terminal portions 81 exposed. The gaps 60d, 70d, and 80d of the main bodies 60b, 70b, and 80b are aligned with the opening 53 of the holder main body 90a. The holder main body 90a insulates the main bodies 60b and 80b of the U-phase power feed collar 60 and the W-phase power feed collar 80 from the outside of the power feed collar holder 90.

The phase terminal portions 61, 71, and 81 extend in the axial direction from the main bodies 60b, 70b, and 80b and then bend radially outward. A power feed terminal row Fr connecting the distal ends of the phase terminal portions 61, 71, and 81 defines the outer diameter of the power feed bus bar 51. The diameter of the power feed terminal row Fr is less than or equal to the outer diameter of the stator 40 of the electric motor 11A and greater than or equal to the outer diameter of the output shaft 16 of the electric motor 11A.

The phase terminal portions 61, 71, and 81 do not overlap one another in the axial direction of the phase power feed collars 60, 70, and 80, and each of the phase terminal portions 61, 71, and 81 overlaps with one of the guide grooves 94. The phase terminal portions 61, 71, and 81 are arranged in the order of U, V and W from the ends 60c, 70c and 80c, each of which is the start point of the clockwise arrangement and one of two ends 60c, 70c, or 80c defining the gap 60d, 70d, or 80d. The lengths of the phase terminal portions 61, 71, and 81, which extend from the holder main body 90a and bend, are set so that the U phase is the longest, followed by the V phase and the W phase. For insulation purposes, adjacent ones of the phase terminal portions 61, 71, and 81 are spaced apart by a sufficient distance.

Figure 4:
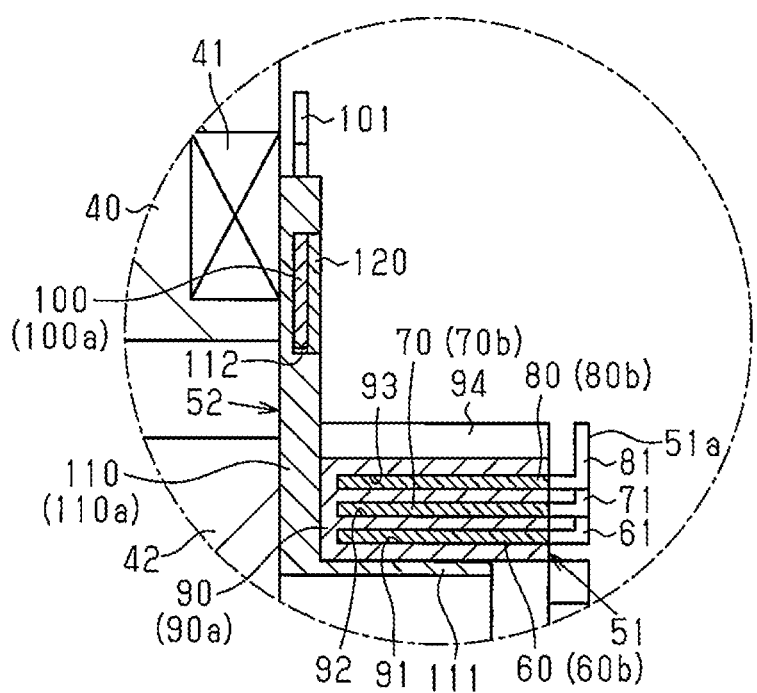
FIG. 4 is an enlarged partial cross-sectional view showing the connection module of the electric motor unit.

As shown in FIGS. 2 and 4, the surfaces of ends of phase terminal portions 61, 71, and 81 in the axial direction of the holder main body 90a that are exposed out of the retention grooves 91 to 93 are coplanar and define the bus bar end face 51a of the connection module 11B.

The phase terminal portions 61, 71, and 81 extend from the holder main body 90a in the axial direction and then bend radially outward at positions separated from the holder main body 90a. This facilitates welding of the first ends of the motor coils 41 to the phase terminal portions 61, 71, and 81 and adjustment of the terminal lengths according to motor coils 41.

Figure 7:
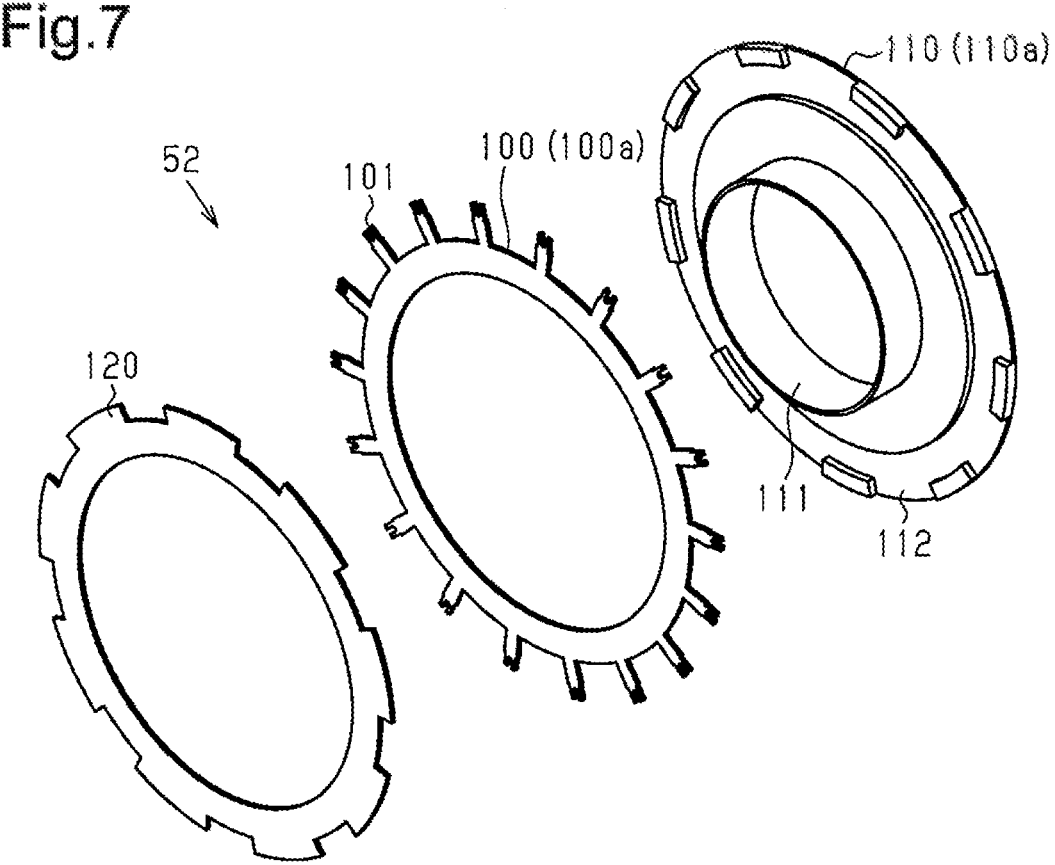
FIG. 7 is an exploded perspective view showing a neutral bus bar of the connection module.
Figure 8:
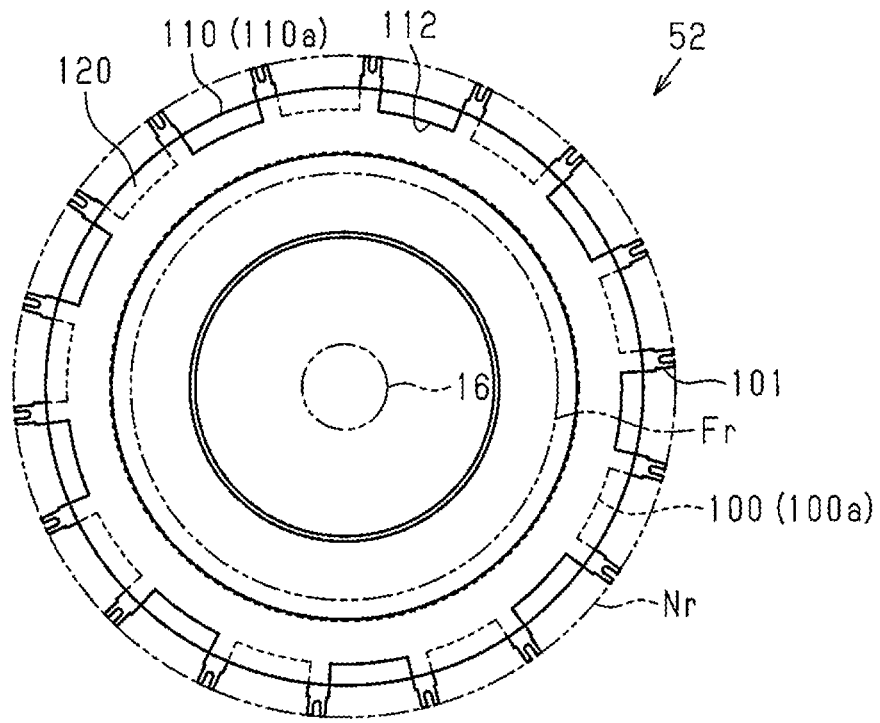
FIG. 8 is a front view showing the neutral bus bar.

Referring to FIGS. 7 and 8, the structure of the neutral bus bar 52 will now be described. The neutral bus bar 52 includes a neutral collar 100, a lower member 110, and a retention plate 120. The neutral collar 100 is made of a metal plate such as a copper plate. The lower member 110 and the retention plate 120 are made of an insulating material such as plastic and serve as insulators. The neutral collar 100 is a power distribution member that electrically connects the first end of each motor coil 41, which is connected to the inverter Inv, to the second end on the opposite side.

As shown in FIG. 7, the neutral collar 100 includes a main body 100a, which is formed by cutting a metal plate into a circular or annular shape. The main body 100a includes a plurality of neutral terminal portions 101, which connects the second ends of the motor coils 41 to one another. The present embodiment includes 18 neutral terminal portions 101, six terminal portions for each phase. The neutral terminal portions 101 are arranged at uniform intervals in the circumferential direction of tine main body 100a.

The lower member 110 includes a lower member main body 110a, which is ring-shaped and made of an insulating material. A cylindrical section 111 extends from the center area of the lower member main body 110a in the axial direction of the lower member main body 110a. The outer diameter of the cylindrical section 111 is substantially the same as the inner diameter of the power feed collar holder 90 of the power feed bus bar 51. The lower member main body 110a includes an accommodation recess 112, which holds the neutral collar 100. The retention plate 120 is circular and made of an insulating material. The retention plate 120 is shaped to be fitted into the accommodation recess 112 of the lower member main body 110a.

As shown in FIG. 8, the neutral collar 100 is held by both the lower member 110 and the retention plate 120 with the main body 100a insulated from the outside. The neutral collar 100 is received in the accommodation recess 112 of the lower member 110 with the neutral terminal portions 101 exposed. The main body 100a of the neutral collar 100 is received in the lower member main body 110a and covered by the retention plate 120 in the axial direction.

The neutral terminal portions 101 extend radially outward from the main body 100*a* to form an arrangement. A neutral terminal row Nr connecting the distal ends of the neutral terminal portions 101 defines the outer diameter of the neutral bus bar 52. The diameter of the neutral terminal row Nr is less than or equal to the outer diameter of the stator 40 of the electric motor 11A and greater than or equal to the outer diameter of the output shaft 16 of the electric motor 11A. As shown in FIG. 6, the diameter of the neutral terminal row Nr is greater than or equal to the outer diameter of the power feed terminal row Fr.

As shown in FIGS. 3 and 4, the lower member 110 insulates the main body 100*a* of the neutral collar 100 from the motor coils 41 of the electric motor 11A. Further, the retention plate 120 insulates the main body 100*a* of the neutral collar 100 from the main bodies 60*b*, 70*b*, and 80*b* and the phase terminal portions 61, 71, and 81 of the power feed bus bar 51 and the lead wires of the motor coils 41. For insulation purposes, a sufficient distance is provided between the terminals of each neutral terminal portion 101.

Figure 9A:
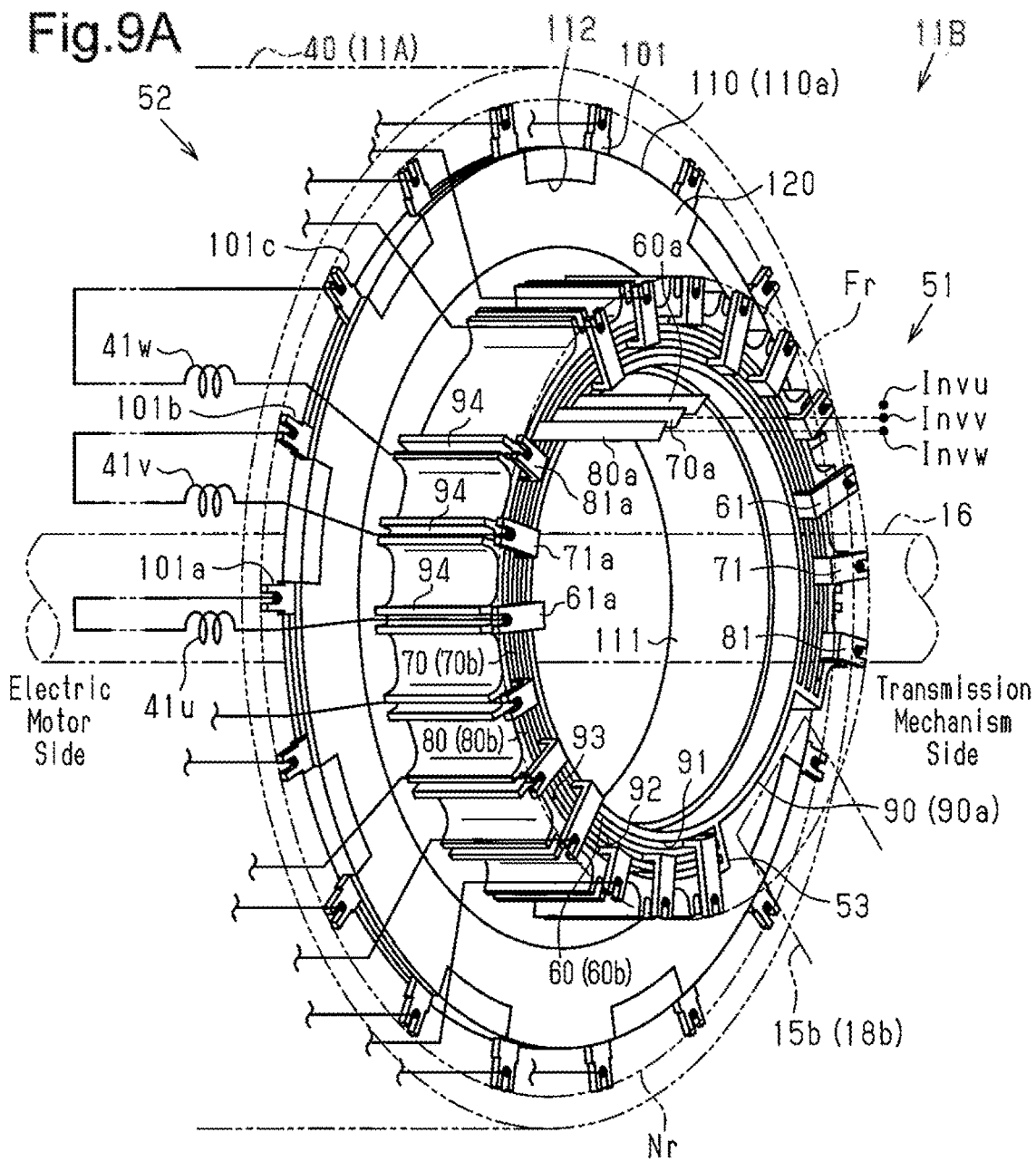
FIG. 9A is a perspective view showing the connection module.

As shown in FIG. 9A, the connection module 11B is an assembly formed by coupling the power feed collar holder 90 to the lower member 110 and the retention plate 120. The cylindrical section 111 of the lower member 110 is fitted into the power feed collar holder 90 to couple the lower member no and the retention plate 120 to the power feed collar holder 90.

The power feed bus bar 51 and the neutral bus bar 52 are arranged side by side in the axial direction of the output shaft 16. The power feed terminal row Fr is separated from the neutral terminal row Nr in the radial direction of the output shaft 16. The power feed terminal row Fr is separated from the neutral terminal row Nr also in the axial direction of the output shaft 16. That, is, the phase terminal portions 61, 71, and 81 are separated from the neutral terminal portions 101 in both the radial and axial directions of the output shaft 16.

During manufacturing of the electric motor unit 11, in which the connection module 11B is fixed to the stator 40 of the electric motor 11A, the arrangement of the phase terminal portions 61, 71, and 81 and the neutral terminal portions 101 is adjusted by setting the positional relationship between the power feed terminal row Fr and the neutral terminal row Nr.

Figure 10:
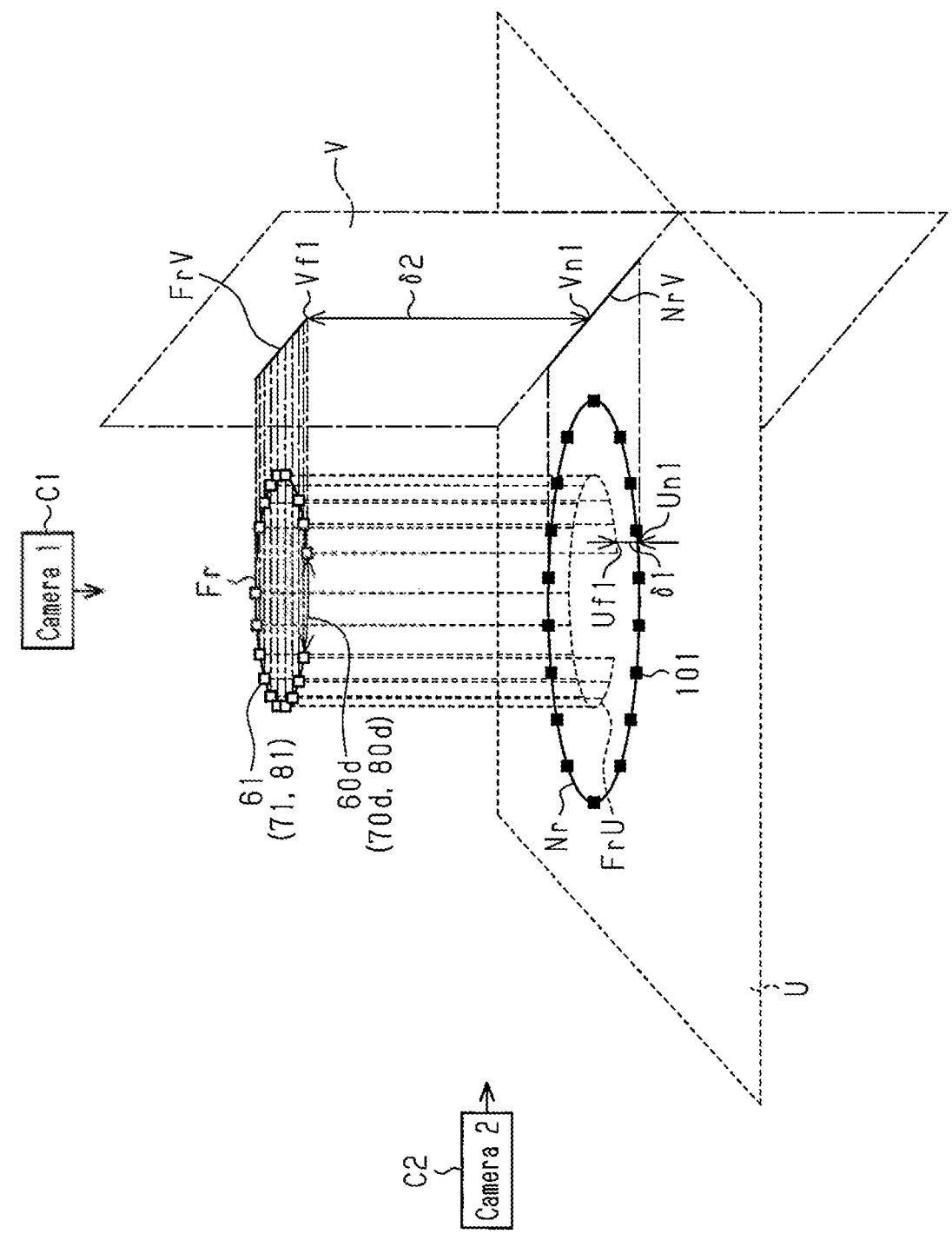
FIG. 10 is a schematic view showing the positional relationship between terminal rows of a first example.

As shown in FIG. 10, a camera C1 oriented in the vertical direction and a camera C2 oriented in the lateral direction detect a three-dimensional positional relationship between the power feed terminal row Fr and the neutral terminal row Nr in the connection module 11B. The positional relationship between the power feed terminal row Fr and the neutral terminal row Nr determines the arrangement of the phase terminal portions 61, 71, and 81 and the neutral terminal portions 101.

The camera C1 defines a predetermined first cross section U with respect to the connection module 11B. The camera C1 detects a first cross section power feed terminal row FrV of the phase terminal portions 61, 71, and 81 projected onto the first cross section U and the neutral terminal row Nr of the neutral terminal portions 101 in the first cross section U. When the electric motor unit 11 is placed in a predetermined position, the first cross section U extends perpendicular to the axis of the connection module 11B, which is the axis of the stator 40 or the rotor 42 of the electric motor 11A.

Figure 11:
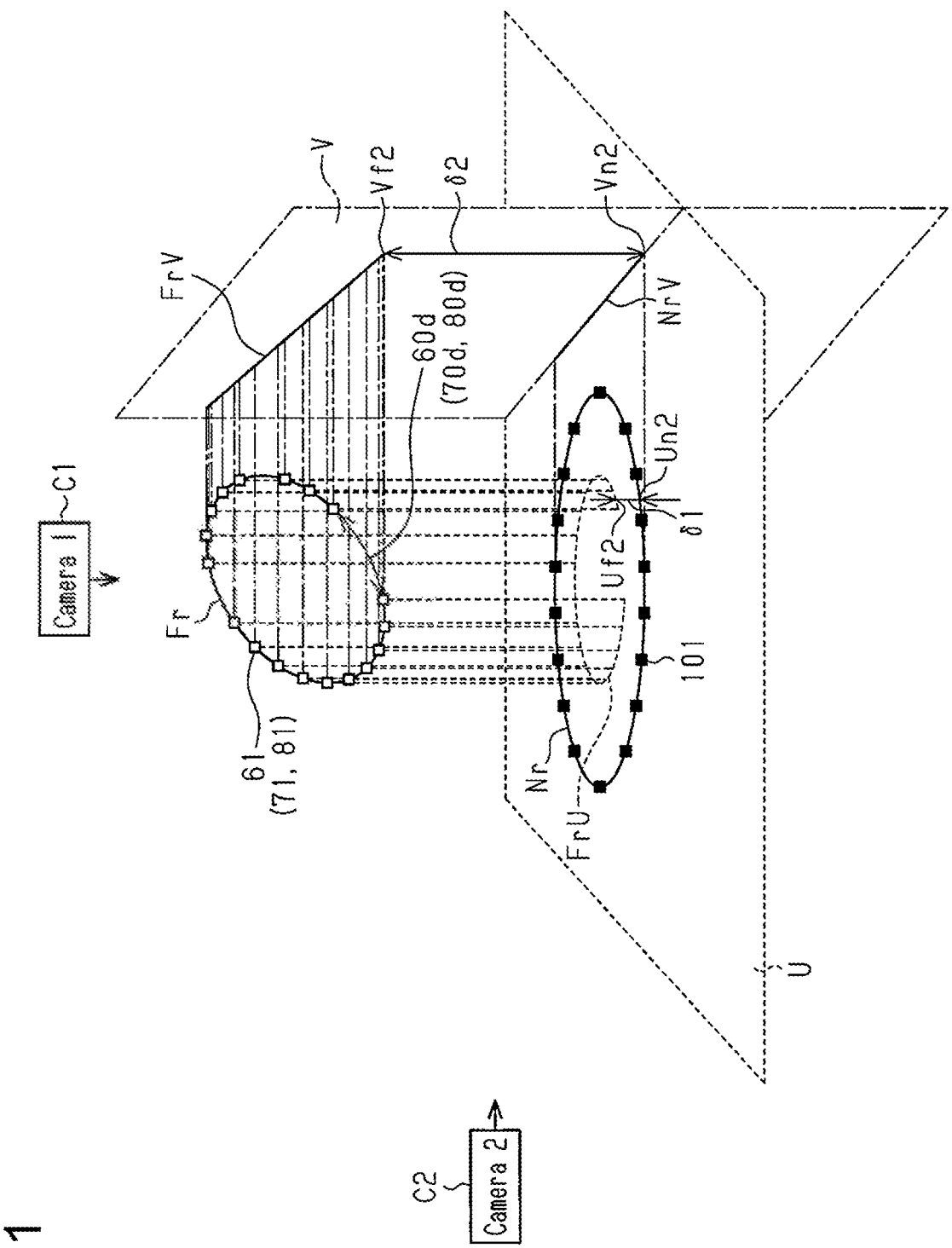
FIG. 11 is a schematic view showing the positional relationship between terminal rows of a second example.
Figure 12:
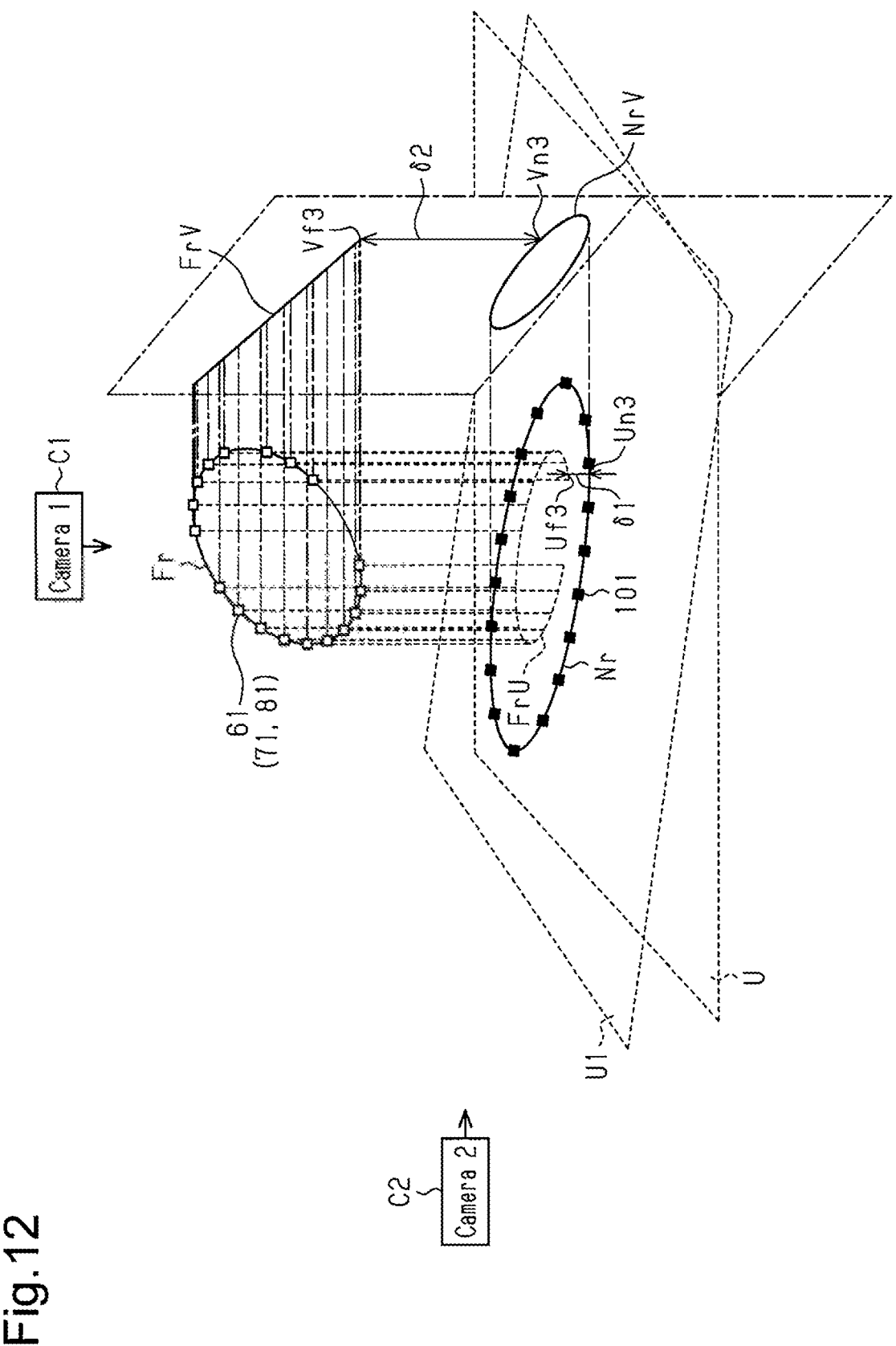
FIG. 12 is a schematic view showing the positional relationship between terminal rows of a third example.

The camera C2 defines a predetermined second cross section V with respect to the connection module 11B. The camera C2 detects a second cross section power feed terminal row FrV of the phase terminal portions 61, 71, and 81 projected onto the second cross section V and the second cross section neutral terminal row NrV of the neutral terminal portions 101 projected onto the second cross section V. The second cross section V extends perpendicular to the first cross section U and, when the electric motor unit 11 is placed in a predetermined position, extends parallel to the axis of the connection module 11B, which is the axis of the stator 40 or the rotor 42 of the electric motor 11A. In FIGS. 10 to 12, for illustrative purposes, the second cross section V is displaced from the actual position in the radial direction of the connection module 11B. For example, when the phase terminal portions 61, 71, and 81 are separated from the neutral terminal portions 101 in the radial and axial directions of the output shaft 16, the positional relationship between the power feed terminal row Fr and the neutral terminal row Nr will be as follows.

As shown in FIG. 10, the first cross section U includes all the neutral terminal portions 101 and the neutral terminal row Nr. The following example is referred to as the "first example."

In the first example, when viewed in a direction intersecting with the first cross section U, the neutral terminal row Nr and the first cross section power feed terminal row FrU in the first cross section U are annular terminal rows of different outer diameters and do not overlap with each other. In the first cross section U, the point on the neutral terminal row Nr that is closest to the first cross section power feed terminal row FrU is defined as a point Un1, and the point on the first cross section power feed terminal row FrU that is closest to the neutral terminal row Nr is defined as a point Uf1. The distance $\delta 1$ between the points Un1 and Uf1 is greater than zero. The distance $\delta 1$ is the minimum distance between the neutral terminal row Nr and the first cross section power feed terminal row FrU in the first cross section U.

In the first example, when viewed in a direction intersecting with the second cross section V, the second cross section neutral terminal row NrV and the second cross section power feed terminal row FrV in the second cross section V are straight or substantially straight lines that are parallel to each other. In the second cross section V, the point on the second cross section neutral terminal row NrV that is closest to the second cross section power feed terminal row FrV is defined as a point Vn1, and the point on the second cross section power feed terminal row FrV that is closest to the second cross section neutral terminal row NrV is defined as a point Vf1. The distance $\delta 2$ between the points Vn1 and Vf1 is greater than zero. The distance $\delta 2$ is the minimum distance between the second cross section neutral terminal row NrV and the second cross section power feed terminal row FrV in the second cross section V.

As shown in FIG. 11, the power feed terminal row Fr is inclined with respect to the neutral terminal row Nr in some cases. In a similar manner as the first example, the cross section including all neutral terminal portions 101 and the neutral terminal row Nr is the first cross section U. The following example is referred to as the "second example."

In the second example, when viewed in a direction intersecting with the first cross section U, the neutral terminal row Nr in the first, cross section U is circular, but the first cross section power feed terminal row FrU is an ellipse or elliptical and has a longer diameter and a shorter diameter. The circular neutral terminal row Nr does not overlap with the elliptical first cross section power feed terminal row FrU. In the first cross section U, the point on the neutral terminal row Nr that is closest to the first cross section power feed terminal row FrU is defined as a point Un2, and the point on the first cross section power feed terminal row FrU that is closest to the neutral terminal row Nr is defined as a point Uf2. The distance δ1 between the points Un2 and Uf2 is greater than zero.

In the second example, when viewed in a direction intersecting with the second cross section V, the second cross section neutral terminal row NrV and the second cross section power feed terminal row FrV in the second cross section V are not parallel to each other. In the second cross section V, the point on the second cross section neutral terminal row NrV that is closest to the second cross section power feed terminal row FrV is defined as a point Vn2, and the point on the second cross section power feed terminal row FrV that is closest to the second cross section neutral terminal row NrV is defined as a point Vf2. The distance δ2 between the points Vn2 and Vf2 is greater than zero.

Even when the power feed terminal row Fr is inclined with respect to the neutral terminal row Nr, the phase terminal portions 61, 71, and 81 are determined to be separated from the neutral terminal portions 101 in the radial and axial directions of the output shaft 16 when the distance δ1 in the first cross section U and the distance δ2 in the second cross section V are greater than zero. In this case, the inclination of the power feed terminal row Fr with respect to the neutral terminal row Nr is accepted as manufacturing tolerance.

As shown in FIG. 12, the neutral terminal row Nr is inclined with respect to the power feed terminal row Fr in some cases. In this case, in contrast to the first and second examples, a first cross section U1 that includes all neutral terminal portions 101 and the neutral terminal row Nr is inclined with respect to the first cross section U. The following example is referred to as the "third example."

In the third example, when viewed in a direction intersecting with the first cross section U, the neutral terminal row Nr and the first cross section power feed terminal row FrU in the first cross section U1 are ellipses of different outer diameters and do not overlap with each other. In the first cross section U1, the point on the neutral terminal row Nr that is closest to the first cross section power feed terminal row FrU is defined as a point Un3, and the point on the first cross section power feed terminal row FrU that is closest to the neutral terminal row Nr is defined as a point Uf3. The distance δ1 between the points Un3 and Uf3 is greater than zero.

In the third example, when viewed in a direction intersecting with the second cross section V, the second cross section neutral terminal row NrV is elliptical, and the second cross section power feed terminal row FrV is linear in the second cross section V. In the second cross section V, the point on the second cross section neutral terminal row NrV that is closest to the second cross section power feed terminal row FrV is defined as a point Vn3, and the point on the second cross section power feed terminal row FrV that is closest to the second cross section neutral terminal row NrV is defined as a point Vf3. The distance δ2 between the points Vn3 and Vf3 is greater than zero.

Even when the neutral terminal row Nr is inclined with respect to the power feed terminal row Fr as described above, the phase terminal portions 61, 71, and 81 are determined to be separated from the neutral terminal portions 101 in the radial and axial directions of the output shaft 16 when the distance δ1 in the first cross section U1 and the distance δ2 in the second cross section V are greater than zero. In this case, the inclination of the neutral terminal row Nr with respect to the power feed terminal row Fr is accepted as manufacturing tolerance.

In the second and third examples, the phase terminal portions 61, 71, and 81 are determined to be not separated from the neutral terminal portions 101 in the radial and axial directions of the output shaft 16 when the distance δ1 or the distance δ2 is not greater than zero and the terminal rows cross each other in the first cross section U (the first cross section U1) or the second cross section V. In this case, the positional relationship between the neutral terminal row Nr and the power feed terminal row Fr is determined to be out of manufacturing tolerance. To correct this problem, the arrangement of the phase terminal portions 61, 71, and 81 and the neutral terminal portions 101 will be adjusted.

In the fourth example, at least one of the terminal rows in the first cross section U and the second cross section V is corrugated. The distances δ1 and δ2 can still be determined in the same manner in principle as the examples described above.

The first to fourth examples hold true even when the power feed terminal row Fr and the neutral terminal row Nr are switched in detection of the three-dimensional positional relationship between the power feed terminal row Fr and the neutral terminal row Nr in the connection module 11B using the two cameras C1 and C2. In this case, the first cross section U (or the first cross section U1) is a cross section including all phase terminal portions 61, 71, and 81 and the power feed terminal row Fr. This cross section may be curved. At least one of the cameras C1 and C2 may be replaced with a 3D stereo camera that generates optical stereo images or a monocular camera for position detection. This enables direct obtainment of the three-dimensional positions of the terminals, thereby determining the distances δ1 and δ2 using a measurement device or the like (not shown) in a similar manner as the examples described above. In this case, the cross sections may be set freely, and intersecting planes may be selected as appropriate.

Returning to FIG. 9A, in the connection module 11B, each of the phase terminal portions 61, 71, and 81 of the power feed bus bar 51 is connected to a neutral terminal portion 101 of the neutral bus bar 52 via a motor coil 41, which is wound around a tooth of the stator 40, by welding or another method.

Each of the phase terminal portions 61, 71, and 81 is connected to the first end of the lead wire of a motor coil 41 of the corresponding phase. Each lead wire extends through between the terminals of a neutral terminal portion 101 of the connection module 11B and then extends along the lower member 110 and the retention plate 120 of the neutral bus bar 52, which are insulated from the main body 100a of the neutral collar 100. After extending over the neutral bus bar 52, which is insulated from the main bodies 60b, 70b, and 80b of the phase power feed collars 60, 70, and 80, the lead wire extends along the guide groove 94 adjacent to one or the phase terminal portions 61, 71, and 81 to be connected.

For example, a U-phase terminal portion 61a is connected to the first end of the lead wire of a corresponding U-phase motor coil 41u. The second end of the lead wire of the motor coil 41u is connected to a neutral terminal portion 101a. A V-phase terminal portion 71a is connected to the first end of the lead wire of a corresponding V-phase motor coil 41v. The second end of the lead wire of the motor coil 41v is connected to a neutral terminal portion 101b. A W-phase terminal portion 81a is connected to the first end of the lead wire of a corresponding W-phase motor coil 41w. The second end of the lead wire of the motor coil 41w is connected to a neutral terminal portion 101c.

Figure 9B:
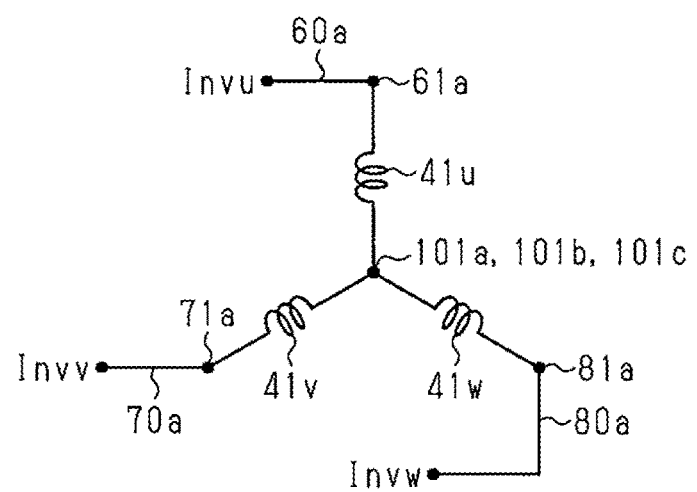
FIG. 9B is a schematic view showing how the connection module is connected.

As shown in FIG. 9B, the supply portions 60a, 70a, and 80a connect the phase terminal portions 61a, 71a and 81a to the power supply lines Invu, Invv, and Invw, respectively. The power supply lines Invu, Invv, and Invw are associated with the phases of the inverter Inv. The motor coils 41u, 41v, and 41w connect the phase terminal portions 61a, 71a and 81a to the neutral terminal portions 101a, 101b, and 101c, respectively, in a star connection (Y connection).

The present embodiment operates in the following manner and provides the following advantages.

(1) The phase terminal portions 61, 71, and 81 and the neutral terminal portions 101 are arranged such that the minimum distance between the second cross section neutral terminal row NrV and the second cross section power feed terminal row FrV in the second cross section V, which is the distance δ2, is greater than zero. When thus arranged, the phase terminal portions 61, 71, and 81 are separated from the neutral terminal portions 101 at least in the axial direction of the output shaft 16 and are not on the same circumference. This structure results in longer distances between adjacent terminal portions in each or the power feed bus bar 51 and the neutral bus bar 52 as compared to a structure in which the phase terminal portions 61a, 71a, and 81a and the neutral terminal portions 101 are located on the same circumference. This allows adjacent terminal portions of the power feed bus bar 51 and the neutral bus bar 52 to be closer while maintaining sufficient insulation. Accordingly, the electric motor unit 11 and thus the vehicle drive unit 10 can be reduced in size.

(2) The phase terminal portions 61, 71, and 81 are positioned on a circumference, and neutral terminal portions 101 are positioned on another circumference. In addition, the phase terminal portions 61, 71, and 81 and the neutral terminal portions 101 are arranged such that the minimum distance between the neutral terminal row Nr and the first cross section power feed terminal row FrU in the first cross section U or the first cross section U1 is greater than zero. When thus arranged, the phase terminal portions 61, 71, and 81 are separated from the neutral terminal portions 101 in the axial direction of the output shaft 16 and also in the radial direction of the output shaft 16, that is, the radial direction of a circle defined by the phase terminal portions 61, 71, and 81 or the neutral terminal portions 101. This increases the distance between the phase terminal portions 61, 71, and 81 and the neutral terminal portions 101, facilitating insulation between the power feed bus bar 51 and the neutral bus bar 52. In addition, arranging the phase terminal portions 61, 71, and 81 and the neutral terminal portions 101 on circumferences facilitates adjustment of the arrangement of terminal portions.

(3) The power feed collar holder 90 of an insulating material covers the power feed bus bar 51, and the lower member 110 and the retention plate 120 of an insulating material cover the neutral bus bar 52. The power feed collar holder 90 includes the opening 53 located between specific terminal portions that are adjacent to each other in each set of phase terminal portions 61, 71, and 81. As such, the power feed collar holder 90 provides insulation between the terminal portions of the power feed bus bar 51 that are located on the opposite sides of tine opening 53. In addition, as shown in FIG. 9A, the opening 53 of the power feed bus bar 51 receives the bearing 18b, which forms the transmission mechanism 14, and the bearing holder 15f. This facilitates installation of the electric motor unit 11 into the vehicle drive unit 10, allowing for reduction in the size of the vehicle drive unit 10.

(4) The connection module 11B is an assembly formed by coupling the power feed collar holder 90 to the lower member 110 and the retention plate 120. This structure minimizes the distance between the power feed bus bar 51 and the neutral bus bar 52, while still providing insulation between the power feed bus bar 51 and the neutral bus bar 52 and between the terminal portions. Accordingly, the connection module 11B and thus the electric motor unit 11 can be reduced in size.

(5) The opening 53 of the power feed bus bar 51 receives the bearing 18b, which forms the transmission mechanism 14, and the bearing holder 15f. This structure allows the electric motor unit 11 and the transmission mechanism 14 to be close to each other when combined into a unit as compared to a structure that lacks the opening 53. Accordingly, the electric motor unit 11 and the transmission mechanism 14, which includes rotary shafts such as the input shaft 17, the intermediate shaft 18, and the drive shafts 19 and 20, are combined into a unit with a minimum distance between each other. This allows for reduction in the size of the vehicle drive unit 10 and also provides sufficient ground clearance when the vehicle drive unit is installed in a vehicle. In addition, the electric motor unit 11 is reduced in size while maintaining insulation as described in advantages (1) to (4), allowing for reduction in the size of the vehicle drive unit 10.

(6) The outer diameter or the power feed bus bar 51 is less than or equal to the outer diameter of the stator 40 of the electric motor 11A and greater than or equal to the outer diameter of the output shaft 16. Thus, the connector CN, which is positioned relative to the power feed bus bar 51, is located near the output shaft 16 of the electric motor 11A. Additionally, the area of the connector CN that extends beyond the outer diameter of the electric motor 11A is reduced, allowing for reduction in the size of the vehicle drive unit 10.

(7) The electric motor unit 11 and the transmission mechanism 14 are accommodated in the common housing 15. This structure allows the electric motor unit 11 and the transmission mechanism 14 to be further close to each other when combined into a unit as compared to a structure that places the electric motor unit 11 and the transmission mechanism 14 in separate housings.

(8) In addition to the bearing holder 15e, the output shaft 16 and the bearing 16b are located on the radially inner side of the connection module 11B. That is, an area of the electric motor unit 11 is used as the space for the bearing 16b supporting the output shaft 16 of the electric motor 11A. This structure allows the electric motor unit 11 and the transmission mechanism 14 to be combined into a unit with a minimum distance between each other.

(9) The transmission mechanism 14 and the connection module 11B overlap by the distance L4 in the axial direction of the output shaft 16. In this position, the intermediate shaft end face 18c, which is an end face of the transmission mechanism 14, is spaced apart from the bus bar end face 51a, which is an end face of the connection module 11B, by the distance L4. This structure allows the electric motor unit 11 and the transmission mechanism 14 to be combined into a unit with a minimum distance between each other in the axial direction of the output shaft 16.

(10) Vehicles need sufficient ground clearance in consideration of traveling on uneven ground. Depending on the size of the vehicle drive unit 10, there may be a case in which sufficient ground clearance is difficult to obtain or in which the cabin or cargo space of the vehicle needs to be reduced in order to arrange the vehicle drive unit 10 with other units of the vehicle. In this respect, the vehicle drive unit 10 of the present embodiment, which has advantages (5) to (9) described above, easily provides a sufficient ground clearance. In addition, sufficient ground clearance can be achieved with less effect on the cabin or cargo space of the vehicle.

(11) With the structure in which the output shaft 16 of the electric motor 11A and the drive shafts 19 and 20 of the transmission mechanism 14 are parallel, the dimension of the electric motor 11A in the radial direction may cause the problems described above when installing the vehicle drive unit 10 into a vehicle. In this respect, separating the phase terminal port ions 61, 71, and 81 from the neutral terminal portions 101 in the axial and radial directions of the output shaft 16 reduces the dimension of the electric motor 11A in the radial direction. This is advantageous in installing the vehicle drive unit 10 into a vehicle.

(12) The connection module 11B is located on the electric motor 11A near the transmission mechanism 14. This reduces the size of the section of the electric motor unit 11 near the resolver 43 compared to a structure in which the connection module 11B is located on the electric motor 11A near the resolver 43. In addition, if the connection module 11B is located near the resolver 43, the current passing through the phase terminal portions 61, 71, and 81 and the neutral terminal portions 101 may adversely affect the resolver 43. A certain distance is therefore required between the connection module 11B and the resolver 43 if the connection module 11B is located near the resolver 43. This may enlarge the electric motor unit 11. Placing the connection module 11B on the electric motor 11A near the transmission mechanism 14 reduces the effects of the current passing through the phase terminal portions 61, 71, and 81 and the neutral terminal portions 101 on the resolver 43, eliminating the need for measures against such effects.

The above illustrated embodiment may be modified as follows.

The transmission mechanism 14 and the connection module 11B do not have to overlap in the axial direction of the output shaft 16. Such a structure has advantages equivalent to advantages (1) to (8) and (10) to (12) described above.

Provided that the inner diameter of the power feed bus bar 51 is greater than or equal to the outer diameter of the output shaft 16, the inner diameter of the power feed bus bar 51 may be less than the outer diameter of the bearing holder 15*e* (the bearing 16*b*) of the motor housing 15*b*. Such a structure allows for further reduction in the size of the electric motor unit 11. The inner diameter of the neutral bus bar 52 may be modified, in a similar manner.

The electric motor unit 11 and the transmission mechanism 14 may be accommodated in separate housings. Such a structure still allows for reduction in the size of the electric motor unit 11.

The transmission mechanism 14 may change the reduction ratio of the rotation speed of the electric motor 11A. For example, an intermediate shaft may be placed between, the input shaft 17 and the intermediate shaft 18 for three-step reduction.

The power feed bus bar 51 may be greater than the stator 40 in outer diameter. Such a structure still allows for reduction in the size of the vehicle drive unit 10 as long as the connection module 11B is placed on the electric motor 11A near the transmission mechanism 14. The outer diameter of the neutral bus bar 52 may be modified in a similar manner.

The connection module 11B may be a single member in which the power feed collar holder 90, the lower member 110, and the retention plate 120 are integrated in a resin molding process. Such a structure achieves an advantage equivalent to advantage (4) described above.

The neutral bus bar 52 may include an opening 53 to avoid interference between the transmission mechanism 14 and the neutral bus bar 52. For example, both of the power feed bus bar 51 and the neutral bus bar 52 may each include an opening 53. If the transmission mechanism 14 does not interfere with the power feed bus bar 51, the power feed bus bar 51 does not have to include the opening 53. Such a structure allows for reduction in the size of the electric motor unit 11.

Any structure may be employed as long as the phase terminal portions 61, 71, and 81 are separated from the neutral terminal portions 101 in the axial direction of the output shaft 16. The neutral terminal row Nr may be identical to the power feed terminal row Fr in diameter.

Depending on the structure of the electric motor unit 11, the positions of the neutral terminal row Nr and the power feed terminal row Fr may be switched. In such a structure, the outer diameter of the power feed terminal row Fr is greater than or equal to the cuter diameter of the neutral terminal row Nr.

The phase terminal portions 61, 71, and 81 and the neutral terminal portions 101 do not have to be arranged on circumferences of circles. Any structure may be employed as long as the distance δ1 in the first cross section u (or the first cross section U1) or the distance δ2 in the second cross section V is greater than zero.

The section of the main body 100*a* of the neutral collar 100 that faces toward the electric motor 11A may be partially or entirely exposed. However, such a structure requires insulating means. For example, the lead wires of the motor coils 41 need to be spaced apart from the main body 100*a* of the neutral collar 100.

The section of the main body 100*a* of the neutral collar 100 that faces toward the transmission mechanism 14 may be partially or entirely exposed. However, such a structure requires insulating means for the phase terminal portions 61, 71, and 81 and the lead wires of the motor coils 41. For example, the lead wires of the motor coils 41 need to be spaced apart from the main body 100*a* of the neutral collar 100.

The collars held by the power feed collar holder 90 may be arranged in the order of W phase, V phase, and U phase or the order of V phase, W phase, and U phase from the inner side of the power feed collar holder 90.

Further, the arrangement order of the phase terminal portions 61, 71, and 81 may be modified to the order of U phase, W phase, and V phase or the order of V phase, W phase, and U phase in a counterclockwise direction from the opening 53.

The phase terminal portions 61, 71, and 81 may be placed in any positions as long as they are located between the output shaft 16 (the input shaft 17) and the intermediate shaft 18 or between the output shaft 16 (the input shaft 17) and the connector CN.

In the embodiment described above, the power teed terminals of the phase terminal portions 61, 71, and 81 of all phases are placed between the output shaft 16 (the input shaft 17) and the intermediate shaft 18 and between the output shaft 16 (the input shaft 17) and the connector CN. However, it is sufficient that, of the phase terminal portions 61, 71, and 81, power feed terminals of at least one of the phases be placed in such sun arrangement. In this case, the terminal portion circle connecting the distal ends or phase terminal portions 61, the terminal portion circle connecting the distal ends of phase terminal portions 71, and the terminal circle connecting the distal ends of phase terminal portions 81 may differ from one another in diameter, and the phase terminal portions 61, 71, and 81 and the neutral terminal portions 101 may be separated from one another in the radial and axial directions of the output shaft 16.

The connection of the motor coils 41 is not limited to a star connection and may be any connection as long as the connection includes a neutral point. For example, a star-delta connection may be used.

The output shaft 16 of the electric motor 11A may be perpendicular to the drive shafts 19 and 20 of the transmission mechanism 14.

The electric motor 11A is not limited to an inner rotor motor and may be an outer rotor motor.

The electric motor unit 11 may be installed in another unit, such as a unit for controlling steering of the vehicle. Such a structure still allows for reduction in the size of the unit. Instead of vehicles, the electric motor unit 11 may be installed in a generator and a household electric appliance.

The vehicle drive unit 10 may be installed in a vehicle in which the front wheels are driven by the rotation torque generated by the electric motor 11A of the electric motor unit 11, or a vehicle in which the front and rear wheels are driven by the rotation torque generated by the electric motor 11A. The vehicle may be front-wheel drive or rear-wheel drive.

DESCRIPTION OF THE REFERENCE NUMERALS

10: vehicle drive unit, 11: electric motor unit, 11A: electric motor, 11B: connection module, 12 and 13: drive wheel, 14: transmission mechanism, 15: housing, 15e and 15f: bearing holder, 16: output shaft, 16a and 16b: bearing, 17: input shaft, 18: intermediate shaft, 18a and 18b: bearing, 18c: intermediate shaft end face, 19 and 20: drive shaft, 21, 22 and 23: gear, 24: differential gear, 40: stator, 41: motor coil, 42: rotor, 51: power feed bus bar, 51a: bus bar end face, 52: neutral bus bar, 53: opening, 60: U-phase power feed collar, 60d: gap, 61; U-phase terminal portion, 70: V-phase power feed collar, 70d: gap, 71: V-phase terminal portion, 80: W-phase power feed collar, 80d: gap, 81: W-phase terminal portion, 90: power feed collar holder, 100: neutral collar, 101: neutral terminal portion, 110: lower member, 120: retention plate, Inv: Inverter, Fr: power feed terminal row, Nr: neutral terminal row, U and U1: first cross section, V: second cross section, $\delta 1$ and $\delta 2$: distance (minimum distance)

The invention claimed is:

1. An electric motor unit comprising:
  an electric motor including
    a plurality of motor coils, which supplies power,
    a cylindrical stator, around which the motor coils are individually wound, and
    a rotor, which is coaxial with the stator; and
  a connection module including:
    a power feed member, which connects a supply source of the power and the motor coils, and
    a neutral member, which connects the motor coils to one another, wherein
  the power feed member includes a power feed distribution member, which includes an arrangement of a plurality of terminal portions,
  the neutral member includes a neutral distribution member, which includes an arrangement of a plurality of terminal portions,
  a plane that includes all of the terminal portions of the power feed member or all of the terminal portions of the neutral member is defined as a first cross section,
  a plane that intersects with the first cross section is defined as a second cross section,
  when viewed in a direction intersecting with the second cross section, a distance between closest points in the arrangement of the terminal portions of the power feed member and the arrangement of the terminal portions of the neutral member is greater than zero,
  the power feed member and the neutral member are each covered by an insulation member with the terminal portions exposed, and
  one of the insulation member covering the power feed member and the insulation member covering the neutral member includes an opening between specific adjacent ones of the terminal portions.

2. The electric motor unit according to claim 1, wherein the terminal portions of the power feed member and the terminal portions of the neutral member are in annular arrangements, and
  when viewed in a direction intersecting with the first cross section, a distance between closest points in the arrangement of the terminal portions of the power feed member and the arrangement of the terminal portions of the neutral member is greater than zero.

3. The electric motor unit according to claim 1, wherein the connection module is an assembly obtained by coupling the insulation member covering the power feed member and the insulation member covering the neutral member to each other or a single member in which the insulation member covering the power feed member and the insulation member covering the neutral member are integrated.

4. A vehicle drive unit comprising:
  the electric motor unit according to claim 1; and
  a transmission mechanism that transmits rotation torque, which is obtained by reducing rotation speed of the electric motor using a plurality of gears, to a drive wheel of a vehicle through a drive shaft, wherein
  the connection module is located on the electric motor near the transmission mechanism, and
  the opening of the one of the insulation member covering the power feed member and the insulation member covering the neutral member receives part of the transmission mechanism.

5. The vehicle drive unit according to claim 4, wherein the electric motor is driven by the power supplied to the power feed member from the supply source through a connector to rotate an output shaft, which is inserted in the rotor, thereby generating rotation torque,
  the power feed member has an outer diameter that is less than or equal to an outer diameter of the stator, and
  the power feed member has an inner diameter that is greater than or equal to an outer diameter of the output shaft.

6. The vehicle drive unit according to claim 4, wherein the transmission mechanism includes a plurality of rotary shafts that serves as rotary shafts of the gears,
  the rotary shafts include
    an input shaft that is coupled to an output shaft inserted in the rotor,
    an intermediate shaft that is parallel to the input shaft, and
    a drive shaft that is parallel to the intermediate shaft, and axes of the input shaft, the intermediate shaft, and the drive shaft are coplanar.

7. The vehicle drive unit according to claim 4, wherein the electric motor unit and the transmission mechanism are accommodated in a common housing.

8. The vehicle drive unit according to claim 4, wherein
a bearing is placed on a radially inner side of the power feed member to rotationally support an output shaft inserted in the rotor, and
the power feed member has an inner diameter that is greater than or equal to an outer diameter of the bearing.

9. The vehicle drive unit according to claim 4, wherein the power feed member and the transmission mechanism overlap in an axial direction of an output shaft inserted in the rotor.

* * * * *